Aug. 7, 1923.
L. KRAJESKI
1,464,283
ADJUSTABLE LICENSE PLATE SUPPORT
Filed July 3, 1922
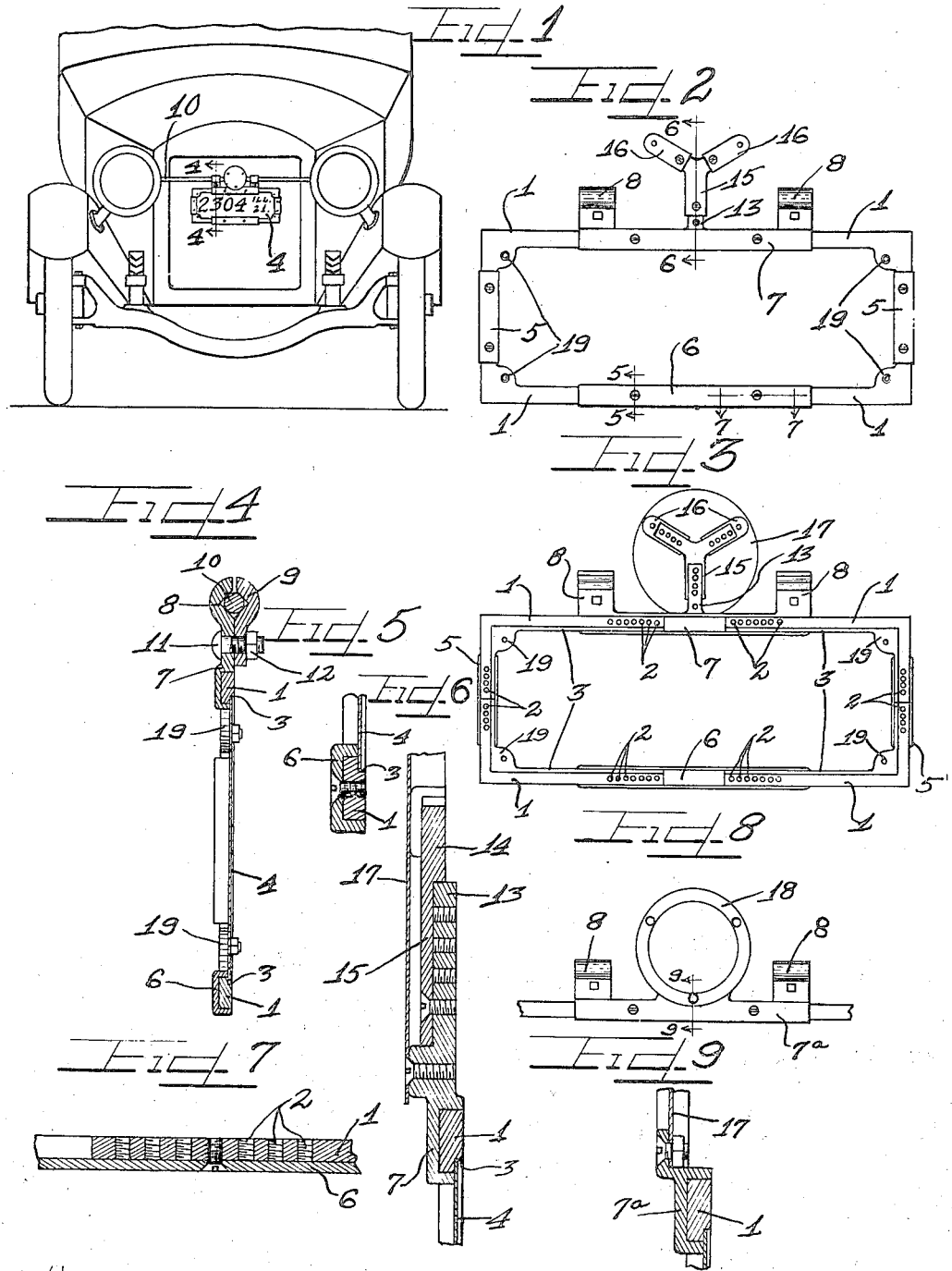

Patented Aug. 7, 1923.

1,464,283

UNITED STATES PATENT OFFICE.

LOUIS KRAJESKI, OF CHICAGO, ILLINOIS.

ADJUSTABLE LICENSE-PLATE SUPPORT.

Application filed July 3, 1922. Serial No. 572,366.

*To all whom it may concern:*

Be it known that I, LOUIS KRAJESKI, a citizen of the United States, and a resident of the city of Chicago, in the county of Cook and State of Illinois, have invented certain new and useful Improvements in an Adjustable License-Plate Support; and I do hereby declare that the following is a full, clear, and exact description of the same, reference being had to the accompanying drawings, and to the numerals of reference marked thereon, which form a part of this specification.

This invention relates to an adjustable license plate support for automobiles.

And it is an object of this invention to provide a license plate support that is capable of supporting both a State license plate and a city license tag.

It is a further object of this invention to provide a novel structure in which the parts are adjustable for accommodating various sized license plates and tags.

With these and other objects in view which will become more apparent in the following description and disclosures, this invention comprises the novel mechanism hereinafter described and more particularly pointed out and defined in the appended claims.

In the accompanying drawings which illustrate a preferred embodiment of this invention and in which similar reference numerals refer to similar features in the different views:

Figure 1 is a front elevational view of an automobile with a license plate thereon supported by my novel support.

Figure 2 is a front elevational view of the support upon an enlarged scale.

Figure 3 is a rear elevational view of the license plate support.

Figure 4 is a section on the line 4—4 of Figure 1 upon an enlarged scale.

Figure 5 is a sectional view upon the line 5—5 of Figure 2 upon an enlarged scale.

Figure 6 is a sectional view upon the line 6—6 of Figure 3 upon an enlarged scale.

Figure 7 is a sectional view upon the line 7—7 of Figure 2 upon an enlarged scale.

Figure 8 is a fragmentary elevational and front view of a modified feature.

Figure 9 is a sectional view on the line 9—9 of Figure 8.

In referring now to the drawings, it will be observed that the license plate support is in the form of a rectangular frame constructed of four metal angle members 1 having a plurality of spaced bolt or screw holes 2 at their ends, and having grooves 3 at their inner edges designed to receive and support a license plate 4 (Figure 4). The four angle members are held in adjustable rectangular formation by means of end channel members 5 and upper and lower channel members 6 and 7. The end channel members 5 embrace the ends of the frame and adjustably connect the vertical legs of the angles 1 by means of screws entering certain of the holes 2; the inner rear edges of the channel members being reduced to correspond with the grooves 3 as shown in Figure 4. The lower channel member is similar to the channel members 5 except that it is longer. It serves to adjustably connect the lower ends of the lower angle members by means of screws entering certain of the holes 2.

The upper channel member 7 embraces the upper legs of the upper angle members and adjustably connects the same by screws entering certain of the screw holes 2. In addition, the channel member 7 is provided with spaced clamping lugs 8 having clamping grooves in their rear faces with which similarly grooved clamping lugs 9 (Figure 4) cooperate for removably clamping the license plate frame or support to the transverse rod 10 that connects the lights on the front part of an automobile. A bolt 11 with an adjustable nut 12 is preferably used to clamp the lugs 8 and 9 on the rod 10.

The channel member 7 is also provided with a vertical shank 13 intermediate the lugs 8 and having a series of screw holes therein. A Y shaped member having a lower channel shaped arm 15 is adjustably secured to the shank 13 by means of a screw or the like. Adjustable extension members 16 having channel shaped portions are adjustably secured to the other two arms of the Y shaped member each of which is provided with a series of threaded holes for receiving a bolt or screw extending through the extension members whereby said extension members may be adjustably secured to the arms of the member 15. The outer ends of the extension members 16 and the lower end of the shank 13 are provided with apertures for the purpose of securing a city license tag 17 which in the present instance is shown as circular and attached to the Y shaped support in Figure 3.

Instead of an adjustable Y shaped support as illustrated in Figures 2 and 3, a simple ring like member 18 having suitably spaced screw or bolt holes may be integrally formed with the channel member 7ª as shown in Figure 8, for supporting the city license tag 17, a portion of which is shown attached in Figure 9.

The State license plate 4 which fits the groove in the rectangular frame is adapted to be screwed or bolted to the inwardly directed corner lugs 19 integral with the angle members 1. From an inspection of Figure 3 it is apparent that by removing the channel members 5, the width of the license plate support may be varied to accommodate license plates of different width, and that by removing the channel members 6 and 7, or 7ª, the length of the frame may be varied to accommodate license plates having different lengths. Then by properly replacing the different channel members, after proper adjustment of the parts, a different sized license plate frame or support is secured. Likewise, it should be noted that the Y shaped member may be raised or lowered on the shank 13 and the extension members 16 may be adjusted on the arms thereof to accommodate different sized city tags.

It should also be noted that registering slats in the channel members and angle members through which securing bolts extend may be substituted for the holes 2.

From the foregoing, it is apparent that a novel extensible license plate support has been provided for various sized license plates and which is capable of also supporting the city license tag. This support as is obvious may be constructed either of stampings or castings.

I am aware that numerous details of construction may be varied through a wide range without departing from the principles of this invention, and I therefore do not purpose limiting the patent granted otherwise than necessitated by the prior art.

I claim as my invention:

1. A license plate support comprising four angle members, channel shaped members adjustably connecting the ends of said angle members, and attaching lugs secured to one of said channel shaped members for supporting the license plate support on an automobile.

2. A license plate support comprising a plurality of angled members, channel shaped members adjustably connecting the ends of said angled members, and a license tag support carried by one of said channel shaped members.

3. A license plate support comprising an extensible rectangular frame having a groove in its inner surface adapted for receiving the license plate, and attaching lugs integral with the frame adapted for having the license plate attached thereto.

4. A license plate support comprising an extensible frame adapted for receiving and sustaining a license plate and having an auxiliary support for sustaining a license tag.

5. An extensible supporting frame for a license plate having a groove at its inner edge for receiving the license plate, and integral lugs for attachment to said plate for sustaining the same in said groove.

In testimony whereof I have hereunto subscribed my name in the presence of two subscribing witnesses.

LOUIS KRAJESKI.

Witnesses:
 CARLTON HILL,
 OSCAR HARTMANN.